UNITED STATES PATENT OFFICE.

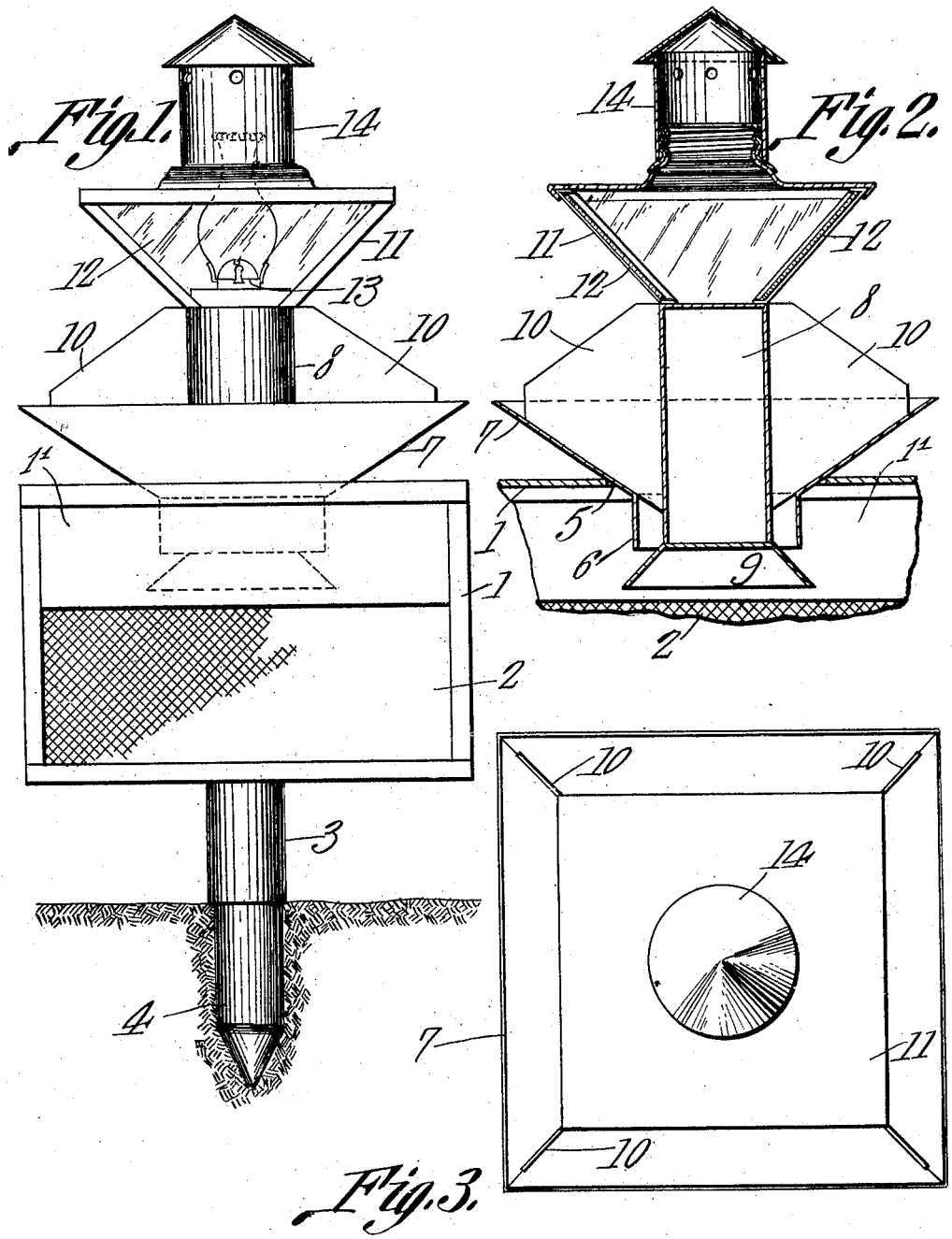

ROBERT N. WOOD, OF CORPUS CHRISTI, TEXAS.

INSECT-TRAP.

983,468.

Specification of Letters Patent.

Patented Feb. 7, 1911.

Application filed June 28, 1910. Serial No. 569,359.

*To all whom it may concern:*

Be it known that I, ROBERT N. WOOD, a citizen of the United States, residing at Corpus Christi, in the county of Neuces and State of Texas, have invented a new and useful Insect-Trap, of which the following is a specification.

This invention relates to an insect trap and consists of the novel construction and arrangement of its parts as hereinafter shown and described.

The object of the invention is to provide a trap of simple structure which employs a light as a luring means for attracting insects and which is provided with transparent panes positioned at downwardly inclined angles to a vertical against which insects strike while approaching the light and by which they are deflected down into a receptacle provided below the said light.

In the accompanying drawings:—Figure 1 is a side elevation of the insect trap. Fig. 2 is a vertical sectional view of the upper portion of the same. Fig. 3 is a top plan view of the same.

The trap comprises a receptacle 1 which is provided in the lower portions of its sides with screens 2 which may be of wire or other material. The upper portions of the sides of the receptacles 1 are formed by non-transparent imperforate panels 1'. A downwardly disposed ferrule 3 is fixed to the bottom of the receptacle 1 and is adapted to receive the upper end of a stake or post 4 which in turn is driven in the ground in the manner as indicated in Fig. 1 of the drawings. The receptacle 1 is provided in its otherwise closed top with a rectangular opening 5 which is adapted to receive a sleeve 6 which depends from a concaved hopper 7 the said hopper being adapted to rest at its lower portion upon the top of the receptacle 1 at the edges of the opening 5 provided therein. A font 8 is concentrically positioned with relation to the hopper 7 and projects down through the sleeve 6 attached to the lower portion of the said hopper. A deflector 9 is fixed to the lower end of the font 8 and the edges of the said deflector project laterally beyond the vertical planes of the sides of the sleeve 6. Partitions 10 hold the font 8 in proper position with relation to the hopper 7 the lower edges of the said partitions resting upon or being attached to the upper surface of the hopper 7 while the inner edges of the said partitions are attached to the sides of the font 8. A frame 11 is mounted upon the upper end of the font 8 and is provided in its sides with transparencies 12 which are inclined downwardly at an angle to a vertical plane. A burner 13 is located in the frame 11 between the transparencies 12 and above the font 8 and is connected with the font in any appropriate manner for the purpose of absorbing oil from the said font and giving off a light as will be explained hereinafter. A detachable hood 14 is mounted upon the top of the frame 11 above the burner 13 and when removed from the said frame 11 affords sufficient room for an operator to get out the burner 13 for the purpose of cleaning the same, etc.

In operation the font 8 is supplied with oil and the burner 13 is ignited. The ferrule 3 is slipped over the upper end of the stake or post 4. The trap is located in any locality where it is desired to catch and destroy objectionable insects and after dark the insects are attracted by the light and as they approach the same strike against the inclined transparencies 12 and are deflected down into the hopper 7. From the said hopper they pass through the sleeve 6 and fall upon the upper side of the deflector 9. From the deflector 9 they fall down into the receptacle 1 and by reason of the fact that the top of the said receptacle is closed except at the opening through which the sleeve 6 passes there will be darkness above the insects but they will see the light through the screens 2. Therefore the insects will try to make their escape through the screens 2 and will not attempt to pass up out of the space between the sleeve 6 and the font 8 for the reason that the said passage will be dark and for the further reason the edge portions of the deflector 9 project beyond the vertical planes of the sides of the sleeve 6 and consequently distort the straight course of escape through the said passage. When it is desired to destroy the insects entrapped as indicated the receptacle 1 together with the ferrule 3 may be removed from the stake or post 4 and the said receptacle may be lowered into hot water or any other destroying agent and at the same time the hopper 7 and sleeve 6 may be lifted from the opening 5 provided in the top of the said receptacle 1.

Having described the invention what I claim as new and desire to secure by Letters Patent is:—

1. An insect trap comprising a receptacle having an opening in its top, a hopper mounted upon the top of the receptacle and having a sleeve which projects down through the opening therein, a font concentrically supported with relation to the hopper and passing through the sleeve, a deflector attached to the lower end of the font and having its side edges projecting beyond the vertical planes of the sides of the sleeve, a frame mounted upon the font, a burner located within the frame and upon the font, and transparencies supported by the frame in inclined position above the hopper.

2. An insect trap comprising a receptacle having an opening in its top, said receptacle being provided with sides and in the vicinity of its bottom with screens, a hopper mounted upon the top of the receptacle and having a sleeve which projects down through the opening therein, a font concentrically positioned with relation to the hopper and extending down through the sleeve, a deflector attached to the lower portion of the font and having its side edges projecting beyond the vertical plane of the sides of the sleeve, a frame mounted upon the upper portion of the font, a burner located within the frame and upon the font, and transparencies supported by the frame in inclined position above the hopper.

3. An insect trap comprising a receptacle having an opening in its top, a ferrule attached to the bottom of the receptacle, said receptacle being provided in the lower portions of its sides with screens, a hopper mounted upon the top of the receptacle and having a sleeve which projects down through the opening therein, a font concentrically positioned with relation to the hopper and passing down through the sleeve, a deflector mounted at the lower portion of the font and having its side edges positioned beyond the vertical planes of the sides of the sleeves, a frame mounted upon the font, a burner located within the frame and upon the font, a detachable hood mounted upon the top of the frame above the font and transparencies supported by the frame in inclined positions above the hopper.

In testimony that I claim the foregoing as my own, I have hereto affixed my signature in the presence of two witnesses.

ROBERT N. WOOD.

Witnesses:
W. R. Du Puy,
R. M. Moorehead.